(12) United States Patent
Ziebarth

(10) Patent No.: US 10,836,217 B1
(45) Date of Patent: Nov. 17, 2020

(54) SENSORY MISALIGNMENT SIPING

(71) Applicant: BRIDGESTONE AMERICAS TIRE OPERATIONS, LLC, Nashville, TN (US)

(72) Inventor: Adam M. Ziebarth, Draper, UT (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 0 days.

(21) Appl. No.: 17/009,171

(22) Filed: Sep. 1, 2020

Related U.S. Application Data

(62) Division of application No. 15/531,861, filed as application No. PCT/US2015/054799 on Oct. 9, 2015.

(60) Provisional application No. 62/089,008, filed on Dec. 8, 2014.

(51) Int. Cl.
*B60C 11/24* (2006.01)
*B60C 11/04* (2006.01)
*B60C 11/12* (2006.01)

(52) U.S. Cl.
CPC ............ *B60C 11/246* (2013.01); *B60C 11/04* (2013.01); *B60C 11/1236* (2013.01); *B60C 11/24* (2013.01); *B60C 2200/06* (2013.01)

(58) Field of Classification Search
CPC ....... B60C 11/246; B60C 11/24; B60C 11/11; B60C 2200/06
See application file for complete search history.

(56) References Cited

U.S. PATENT DOCUMENTS 5,245,867 A * 9/1993 Sube ...................... G01B 11/22
73/146

* cited by examiner

*Primary Examiner* — Robert C Dye
*Assistant Examiner* — Cedrick S Williams

(57) ABSTRACT

A wear detection system for truck steer tires is provided. A plurality of sipe groups are located in a tread rib of the tire. Each sipe group includes a first sipe group portion having an axially inward directed apex and a second sipe group portion having an axially outwardly directed apex, such that an axially directed wear force component causes the apex of the sipe group directed in the direction of the wear force component to be more tactilely detectable by a human fingertip than the apex of the other sipe group portion.

5 Claims, 5 Drawing Sheets

SENSORY MISALIGNMENT SIPING

BACKGROUND OF THE INVENTION

1. Field of the Invention

The present disclosure relates to wear detection systems for tires.

2. Description of the Prior Art

The alignment of vehicle tires relative to the vehicle frame is important to obtaining long life and even wear of the tires. This is particularly true for example on large over the road trucks such as the tractor of an eighteen wheeler. Misalignment of the front steer tires of the truck and/or misalignment of the rear axle or drive tires of the truck relative to the truck frame can lead to uneven wear on the tires and premature tire failure. Also misaligned trailer axles can lead to a tractor pulling in a constant right or left direction, and thus to uneven tire wear.

It is particularly important to detect such uneven wear as early as possible in the life of the tires. Wear detection systems which have previously been proposed are visually based systems and substantial wear occurs on the tires before such wear is detectable through such visually based systems.

Thus there is a continuing need for improved wear detection systems for tires that can detect uneven tire wear due to tire misalignment as early as possible in the life cycle of the tire.

SUMMARY OF THE INVENTION

In one embodiment a truck steer tire comprises a tread area including a plurality of circumferential grooves dividing the tread area into at least four circumferential tread ribs.

At least one of the tread ribs has defined thereon a plurality of sipe groups. Each sipe group includes a first sipe group portion having an axially inwardly directed apex and a second sipe group portion having an axially outwardly directed apex. An axially directed wear force component causes the apex of the sipe group portion directed in the direction of the wear force component to be more tactilely detectable by a human fingertip than the apex of the other sipe group portion.

In another embodiment a truck steer tire comprises a tread area including a plurality of circumferential grooves dividing the tread area into at least four circumferential tread ribs. At least one of the tread ribs has defined thereon a plurality of sipe groups. Each sipe group includes at least two parallel circumferentially extending straight sipes, each sipe group having a maximum circumferential dimension, each sipe group being circumferentially spaced from a next closest sipe group of the plurality of circumferentially spaced sipe groups by a circumferential spacing greater than the maximum circumferential group dimension.

In another embodiment a method is provided for early detection of steering tire wear. The method may comprise:
(a) providing left and right steering tires each having a circumferential row of sipe groups, each group including first and second sipe group portions, each sipe group portion having a shape having an axially directed crest, the crest of the first sipe group portion being directed axially inward and the crest of the second sipe group portion being directed axially outward, such that the crest of one of the sipe group portions is more tactilely detectible than the crest of the other sipe group portion as a result of axially directed wear on the sipe group; and
(b) tactilely inspecting the sipe groups of both tires and detecting at least one of the wear conditions selected from the group including the following wear conditions:
  left tire and right tire inwardly directed sipe group portions detectable indicating excessive toe-in; and
  left tire and right tire outwardly directed sipe group portions detectable indicating excessive toe-out.

In any of the above embodiments the sipes of each sipe group may be so arranged and constructed that when two such tires are mounted as left and right steer tires of a vehicle:
(a) tactilely detectable axially inwardly directed apexes on both tires indicate excessive toe-in, and
(b) tactilely detectable axially outwardly directed apexes on both tires indicate excessive toe-out.

In any of the above embodiments tactilely detectable axially directed apexes on both tires in a common axial direction may indicate drive axle misalignment pushing the vehicle opposite to the common axial direction.

In any of the above embodiments a tactilely detectable axially inward directed apex on the left steer tire and no tactilely detectable axial wear on the right steer tire may indicate a combination of excessive toe-in and drive axle misalignment pulling to the left.

In any of the above embodiments a tactilely detectable axially outwardly directed apex on the left steer tire and no tactilely detectable axial wear on the right steer tire may indicate a combination of excessive toe-out and drive axle misalignment pulling to the right.

In any of the above embodiments a tactilely detectable axially outwardly directed apex on the right steer tire and no tactilely detectable axial wear on the left steer tire may indicate a combination of excessive toe-out and drive axle misalignment pulling to the left.

In any of the above embodiments a tactilely detectable axially inward directed apex on the right steer tire and no tactilely detectable axial wear on the left steer tire may indicate a combination of excessive toe-in and drive axle misalignment pulling to the right.

In any of the above embodiments the tread ribs may include a first axially outer rib and the plurality of sipe groups may be located on the first axially outer rib.

In any of the above embodiments the tire may further include a second axially outer rib axially opposite from the first axially outer rib, and a second plurality of sipe groups circumferentially aligned on the second axially outer rib.

In any of the above embodiments the sipe groups of the second plurality of sipe groups may be axially aligned with respective ones of the sipe groups of the first plurality of sipe groups.

In any of the above embodiments each sipe group portion may have a circumferential length in a range of from 1 cm to 3 cm.

In any of the above embodiments the sipe groups of the plurality of sipe groups may be circumferentially aligned with each other.

In any of the above embodiments the circumferential grooves have a groove depth defining a tread depth of the tread ribs, and each sipe may have a sipe depth no greater than one-half the tread depth.

In any of the above embodiments each sipe may have a sipe depth in a range of from $4/32$ to $5/32$ inch.

In any of the above embodiments each sipe group may have a maximum circumferential group dimension, each sipe group being circumferentially spaced from a next closest sipe group of the plurality of circumferentially spaced sipe groups by a circumferential spacing no greater than the maximum circumferentially group dimension.

In any of the above embodiments the first sipe group portion may include a plurality of circumferentially extending sipes, an axially innermost one of the sipes of the first sipe group portion being shorter than an axially outermost one of the sipes of the first sipe group portion, the axially innermost one of the sipes of the first sipe group portion defining the apex of the first sipe group portion. Similarly, the second sipe group portion may include a plurality of circumferentially extending sipes, an axially outermost one of the sipes of the second sipe group portion being shorter than an axially innermost one of the sipes of the second sipe group portion, the axially outermost one of the sipes of the second sipe group portion defining the apex of the second sipe group portion.

In any of the above embodiments the sipes of the first sipe group portion may be of sequentially longer length from the axially innermost sipe of the first sipe group portion to the axially outermost sipe of the first sipe group portion. Similarly, the sipes of the second sipe group portion may be of sequentially longer length from the axially outermost sipe of the second sipe group portion to the axially innermost sipe of the second sipe group portion.

In any of the above embodiments each sipe group portion may include from 2 to 6 sipes.

In any of the above embodiments the first sipe group portion may comprise a first V-shaped sipe, and the second sipe group portion may comprise a second V-shaped sipe.

In any of the above embodiments each V-shaped sipe may define an included angle in a range of from 90° to less than 180°, and preferably about 120°.

In any of the above embodiments the first V-shaped sipe of the sipe group may be separate from the second V-shaped sipe of the respective sipe group.

In any of the above embodiments the first and second V-shaped sipes of each sipe group may be connected together by a shared leg of each V-shaped sipe.

In any of the above embodiments the sipes may be constructed such that an axially directed wear force component causes an upstream edge of each sipe relative to a direction of the wear force component to be more tactilely detectable by a human fingertip than a downstream edge of each sipe.

In an embodiment all of the sipes of each sipe group may be of substantially equal length to the other sipes of the respective sipe group.

In any of the above embodiments the row of sipe groups for each tire may be located axially outward of the center plane of the respective tire.

In any of the above embodiments the detection of excessive wear conditions may occur within the first 1/32 inch of wear of the tire tread.

One advantage of the disclosed system is that it allows tactile detection of irregular wear, and it is not necessary for the truck operator to be able to clearly see the wear indicators. This is an advantage over prior visually based indicator systems, which sometimes even require the truck operator to lift the hood of the truck to gain visual access to the steer tires.

Numerous other objects features and advantages of the present invention will be readily apparent to those skilled in the art upon a reading of the following disclosure when taken in conjunction with the accompanying drawings.

DETAILED DESCRIPTION

Figure 1A:
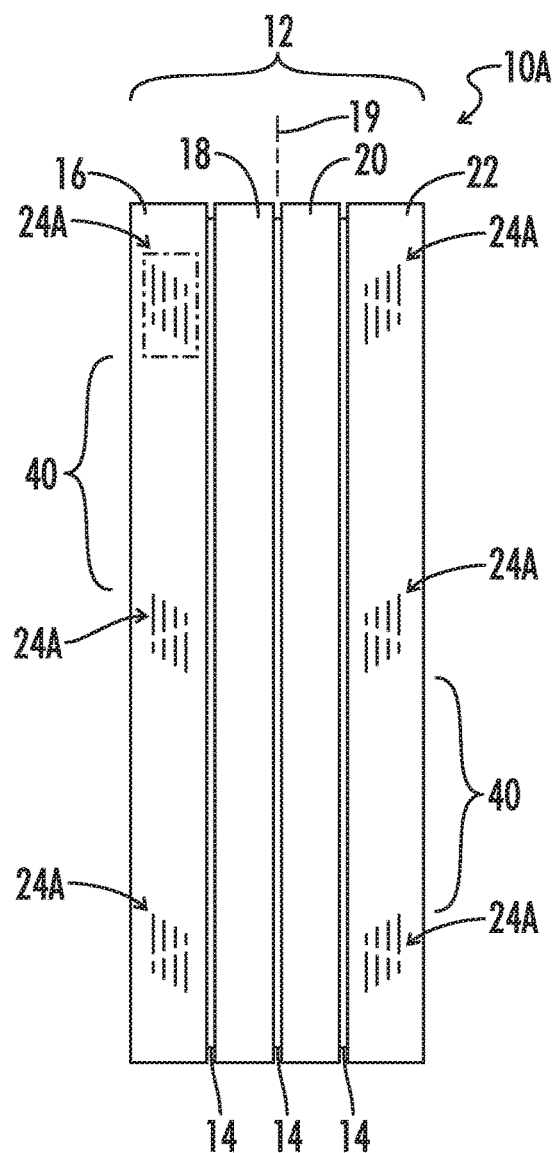
FIG. 1A is a schematic elevation frontal view of a truck steer tire including one embodiment of the sipe groups. The sipe groups included in FIG. 1A each include first and second sipe group portions made up of circumferentially extending sipes.

Referring now to FIG. 1A a truck steer tire is shown and generally designated by the numeral 10A. The tire 10A includes a tread area 12 including a plurality of circumferential grooves 14 typically dividing the tread area into at least four circumferential tread ribs 16, 18, 20 and 22. The ribs 16 and 22 may be referred to as axially outermost tread ribs. The grooves 14 are not necessarily straight, so the resulting tread ribs may have erratic edges although the tread ribs will extend circumferentially around the tire.

Figure 2A:
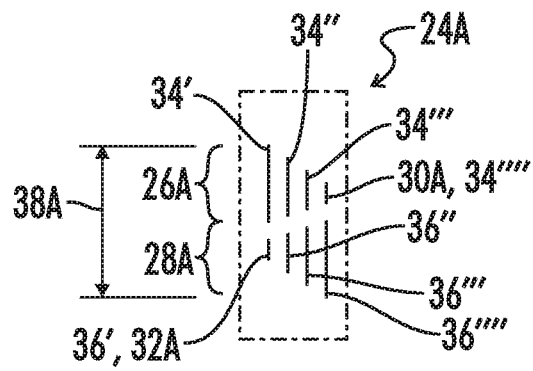
FIG. 2A is an enlarged view of one of the sipe groups of FIG. 1A.

In the embodiment shown in FIG. 1A, the axially outmost ribs 16 and 22 have first and second pluralities of sipe groups 24A defined therein. In FIG. 1A the left uppermost such sipe group 24A has been placed in an imaginary phantom rectangular area and an enlarged view of that area is shown in FIG. 2A.

Figure 1B:
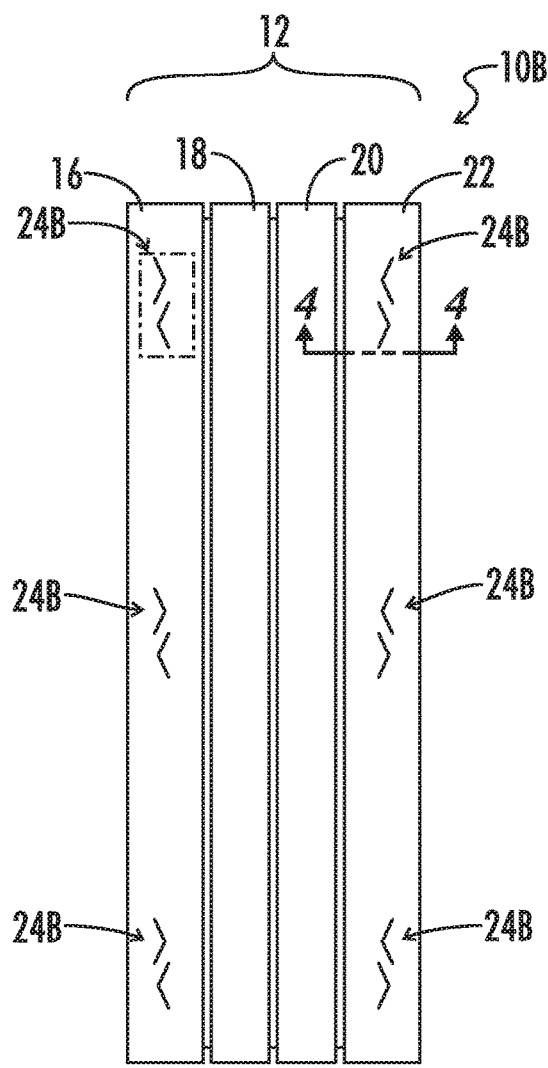
FIG. 1B is a view similar to FIG. 1A showing a truck steer tire including another embodiment of the sipe groups. The sipe groups shown in FIG. 1B each include two V-shaped sipe group portions.

Similarly, in FIG. 1B an alternative embodiment of a truck steer tire is designated by the numeral 10B having modified sipe groups designated by the numeral 24B.

The term sipe is often used to refer to relatively small slots or grooves molded or cut into a tire to subdivide the tread surface and improve traction characteristics. In the present disclosure the sipe groups are not necessarily present in sufficient numbers to significantly affect traction characteristics of the tire, but instead are provided for the purpose of providing a tactilely detectable wear indicator. As used herein, the term sipe refers to any relatively narrow slot or groove, having a width of 1 mm or less.

Any reference herein generally to the tire 10 may refer to either the tire 10A or 10B. Any reference to sipe groups 24 may refer to any of the alternative sipe groups 24A or 24B, or others as shown in FIGS. 2A-2F.

Each of the sipe groups 24 may be described as including a first sipe group portion 26 and a second sipe group portion 28.

For example, as seen in the enlarged view of FIG. 2A, each of the sipe groups 24A includes a first sipe group portion 26A and a second sipe group portion 28A.

The first sipe group portion 26A has an axially inwardly directed apex 30A and the second sipe group portion 28A has an axially outwardly directed apex 32A.

In the embodiment of FIGS. 1A and 2A, the first sipe group portion 26A includes a plurality of circumferentially extending parallel sipes 34'-34''''. An axially innermost one of the sipes 34'''' of the first sipe group portion 26A is shorter than an axially outermost sipe 34' of the first sipe group portion 26A. The axially innermost sipe 34'''' defines the apex 30A of the first sipe group portion 26A.

Similarly, the second sipe group portion 28A includes a plurality of circumferentially extending sipes 36'-36''''. The axially outermost one of the sipes 36' of the second sipe group portion 28A is shorter than the axially innermost sipe 36'''' of the sipes of the second sipe group portion 28A. The axially outermost sipe 36' defines the apex 32A of the second sipe group portion 28A.

The sipes 34 of the first sipe group portion 26A may be described as being sequentially longer in length from the axially innermost sipe 34'''' of the first sipe group portion 26A to the axially outermost sipe 34'.

The sipes 36 of the second sipe group portion 28A may be described as being sequentially longer in length from the axially outermost sipe 36' to the axially innermost sipe 36''''.

Each of the sipe group portions 26A and 28A are shown as including four sipes, but in general each sipe group portion may include from two to six sipes.

The sipes 34 of the first sipe group portion 26A may be further described as including at least two parallel circumferentially extending straight sipes.

The sipe group 24A may be described as having a maximum circumferential group dimension 38A as best seen in FIG. 2A. As seen in FIG. 1A, each sipe group 24A is circumferentially spaced from the next closest sipe group 24A of the plurality of circumferentially spaced sipe groups by a circumferential spacing 40 greater than the maximum circumferential group dimension 38.

Figure 3:
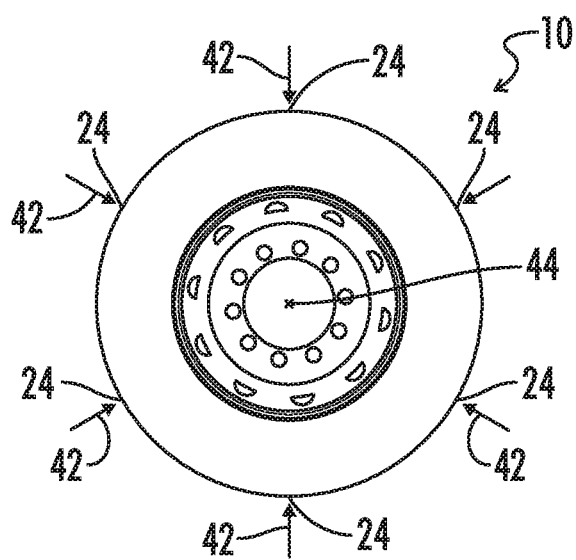
FIG. 3 is a side elevation view of one of the truck tires of FIG. 1A or FIG. 1B showing the circumferential locations of the sipe groups at 60° from each other about the circumference of the tire. The sipe groups may be located adjacent tire wear indicator bars (not shown) present on the tires.

Also, as best seen in FIG. 3, each sipe group 24A may be located at one of the radial locations indicated by arrows 42. In the embodiment shown in FIG. 3, the sipe groups 24A are radially located 60° apart about a rotational axis 44 of the tire 10. More generally, there are preferably at least four sipe groups in each plurality of sipe groups, and preferably no more than about twelve sipe groups in each plurality of sipe groups. A plurality of four sipe groups would preferably be spaced radially 90° apart. A plurality of twelve sipe groups would preferably be spaced radially 30° apart.

Figure 2B:
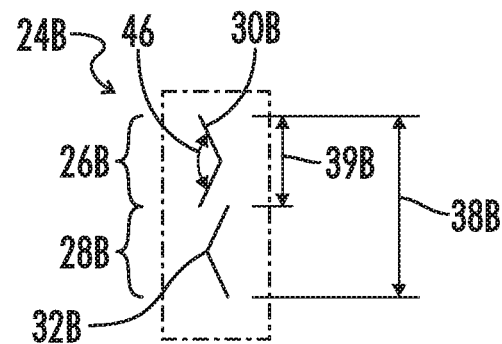
FIG. 2B is an enlarged view of one of the sipe groups of FIG. 1B.

In the embodiment of FIGS. 1B and 2B, the first sipe group portion 26B comprises a first V-shaped sipe, and the second sipe group portion 26C comprises a second V-shaped sipe.

Each V-shaped sipe defines an included angle 46 in a range of from 90° to less than 180°, more preferably about 120°.

In the embodiment seen in FIGS. 1B and 2B the first V-shaped sipe 26B of each sipe group 24B is separate from the second V-shaped sipe 26C of the respective sipe group 24B.

Figure 2C:
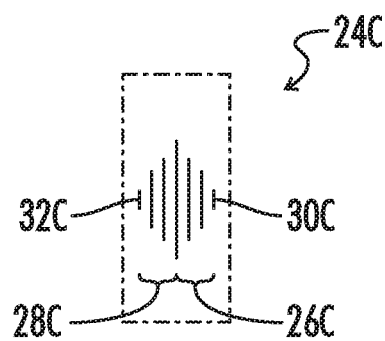
FIG. 2C is an enlarged view of another embodiment of a sipe group.

The Embodiment of FIG. 2C

FIG. 2C shows an alternative sipe group 24C comprised of a plurality of circumferentially extending parallel straight sipes 50 in a diamond shaped pattern which may be divided into a first sipe group portion 26C and a second sipe group portion 28C. The first sipe group portion 26C includes an axially inward directed apex 30C. The second sipe group portion 28C includes an axially outward directed apex 32C.

Figure 2D:
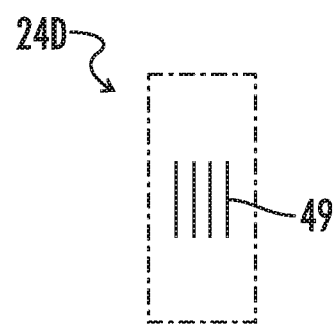
FIG. 2D is an enlarged view of another embodiment of a sipe group.

The Embodiment of FIG. 2D

FIG. 2D illustrates another embodiment of a sipe group 24D comprising four circumferentially extending parallel straight sipes 49, wherein all of the sipes of the sipe group are of substantially equal length to the other sipes of the respective sipe group. This embodiment of sipe group does not include the visual directional aspect of the other embodiments, but the same phenomena can be detected. The user must be educated to the meaning of the relative tactile detectability of the inside or outside edges of the sipes.

Figure 2E:
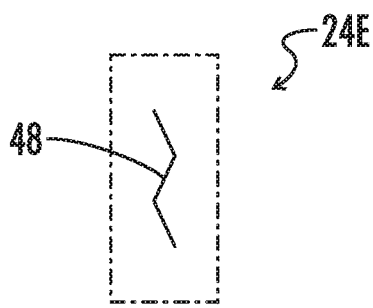
FIG. 2E is an enlarged view of another embodiment of a sipe group.

The Embodiment of FIG. 2E

FIG. 2E shows still another embodiment of V-shaped sipes wherein the first and second V-shaped sipes of each sipe group are connected together by a shared leg 48 of each V-shaped sipe.

Figure 2F:
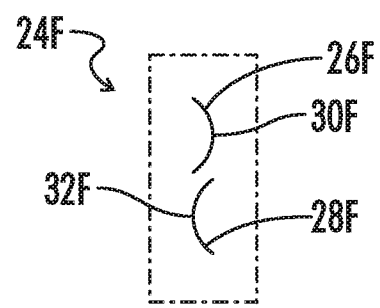
FIG. 2F is an enlarged view of another embodiment of a sipe group.

The Embodiment of FIG. 2F

FIG. 2F shows still another embodiment of sipes somewhat similar to FIG. 2B, but wherein instead of V-shape sipes with a sharp point, the sipes are curved and may be described as having crests 30F and 32F.

Figure 2G:
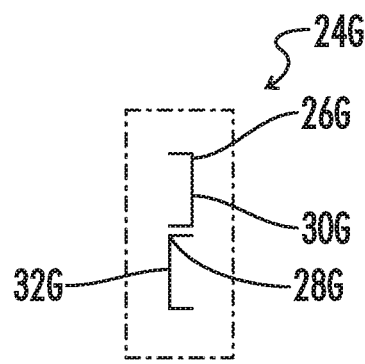
FIG. 2G is an enlarged view of another embodiment of a sipe group.

The Embodiment of FIG. 2G

FIG. 2G shows still another embodiment of sipes having a bracket shape with the circumferential parts of the brackets defining the apexes or crests 30G and 32G.

Figure 2H:
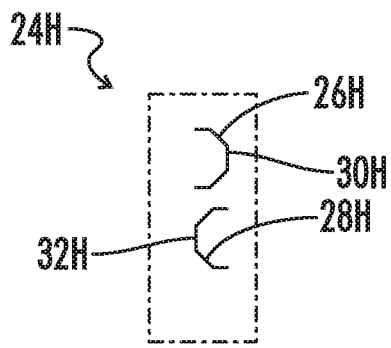
FIG. 2H is an enlarged view of another embodiment of a sipe group.

The Embodiment of FIG. 2H

FIG. 2H shows still another embodiment of sipes made up of a plurality of short straight segments, with the axially outermost and innermost segments defining the apexes or crests 30H and 32H.

Figure 2I:
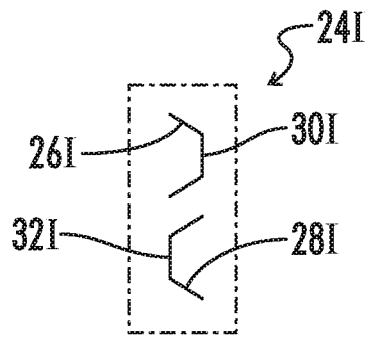
FIG. 2I is an enlarged view of another embodiment of a sipe group.

The Embodiment of FIG. 2I

FIG. 2I shows still another embodiment of sipes having a pyramid shape with the circumferential parts of the pyramids defining the apexes or crests 30I and 32I.

Figure 2J:
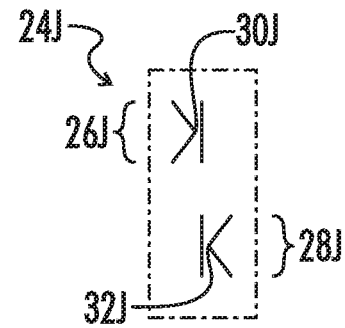
FIG. 2J is an enlarged view of another embodiment of a sipe group.

The Embodiment of FIG. 2J

FIG. 2J shows still another embodiment of sipe group portions combining a V-shape sipe with a straight sipe.
Tactile Detection of Uneven Tire Wear FIGS. 6 and 7 each schematically illustrate a truck, particularly a tractor of an eighteen wheeler, which is generally designated by the numeral 50.

The truck 50 includes a left front steer tire 10L and a right front steer tire 10R. The truck 50 includes first and second rear drive axles 54 and 56 carrying a plurality of drive tires 60. Truck 50 includes a truck frame 52. The truck frame 52 defines a longitudinal axis 58 of the truck 50.

Figure 6:
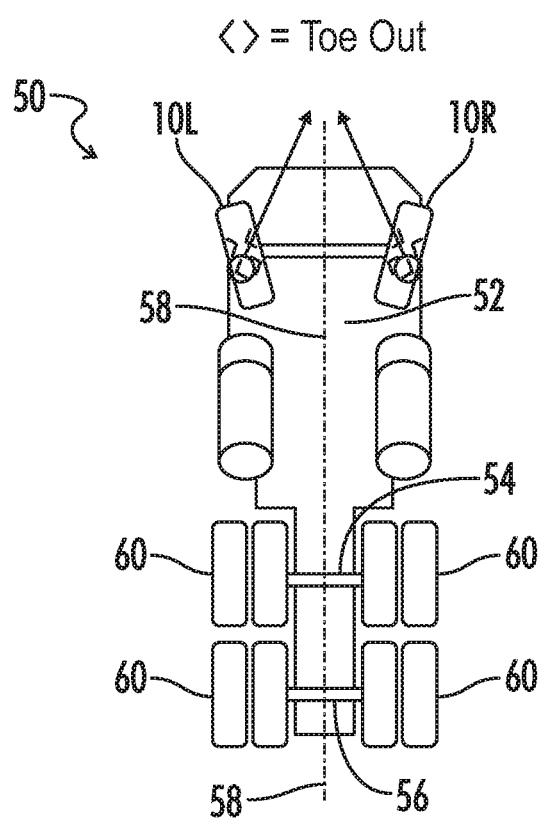
FIG. 6 is a schematic plan view of a truck having two steer tires oriented in an excessive toe-out condition.
Figure 7:
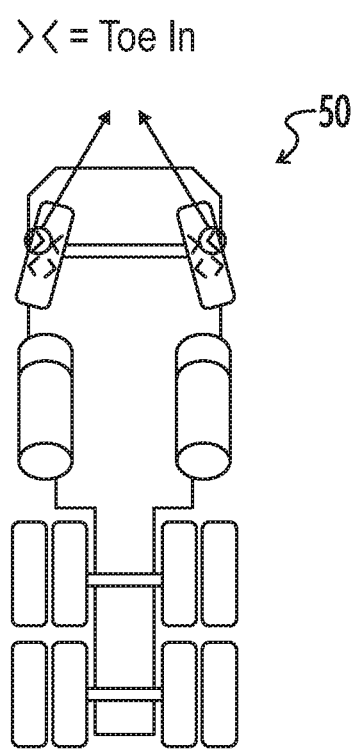
FIG. 7 is a schematic plan view of a truck having two steer tires oriented in an excessive toe-in condition.

In FIG. 6, the steer tires 10L and 10R are schematically illustrated as having an excessive toe-out condition so that the tires are splayed outwardly away from each other. In FIG. 7, the steer tires 10L and 10R are schematically illustrated as having an excessive toe-in condition so that the tires are splayed inwardly toward each other.

Figure 4:
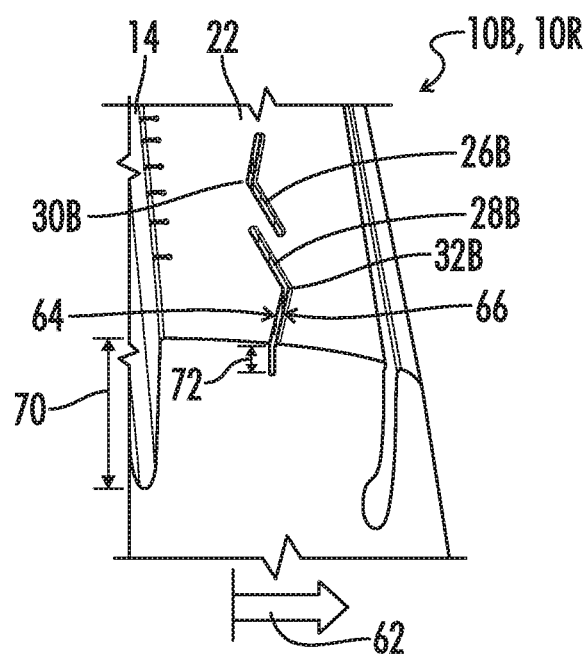
FIG. 4 is a schematic sectioned view taken along line 4-4 of FIG. 2B.

FIG. 4 shows a schematic perspective sectioned view taken along line 4-4 of the tire 10B in FIG. 1B. If the tire 10B in FIG. 4 is presumed to be in the position 10R of FIG. 6, being the right hand steer tire in an excessive toe-out condition, it will be understood that an axially directed wear force component in the direction of the arrow 62 shown in FIG. 4 will occur as a result of the ground surface rubbing across the surface of the tire 10B due to the excessive toe-out condition.

In the enlarged view of FIG. 4, it can be seen that each sipe is a very thin groove and with reference to the axially directed wear force component 62 may be described as having an upstream edge 64 and a downstream edge 66. It has been observed that such an axial wear force component 62 will cause greater wear on the downstream edge 66 of the sipe group portion 28B somewhat rounding off the downstream edge 66 more so than the upstream edge 64.

Figure 5:
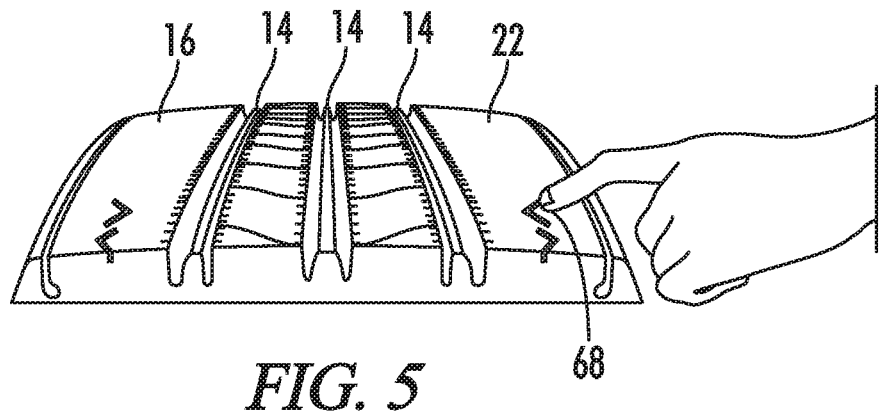
FIG. 5 is a schematic cross-section view illustrating a human hand tactilely engaging a sipe group like that of FIG. 2B.

Thus, a human fingertip 68 as indicated in FIG. 5 can tactilely detect which edge 64 or 66 is the sharpest by sliding the fingertip 68 axially over the sipe as generally indicated in FIG. 5.

Thus for the two V-shaped sipes 26B and 28B seen in FIG. 4, with a axially directed wear force component 62 in the direction indicated by the arrow 62, for the sipe group portion 28B the downstream edge 66 will wear more than the upstream edge 64. Similarly for the sipe group portion 26B the downstream edge will wear more than the upstream edge. Thus the axially outwardly directed apex 32B. will be sharper than will the axially inward directed apex 30B.

Similarly, if one uses sipe groups like those of FIG. 2A wherein each sipe group portion is made up of a plurality of circumferentially extending parallel sipes of successively different lengths, the apex or point 30A of the axially outwardly directed sipe group portion will be sharper to the touch than will the apex of the other sipe group portion.

This phenomenon can be observed on each of the steer tires 10L and 10R to detect various combinations of misalignment which lead to different tire wear patterns.

By comparing the left and right steer tires in this manner, a user can detect very early signs of irregular wear due to misalignment. Initially, for a new tire, there will be no detectable difference in the sharpness of the apexes 30 and 32 of the sipe group portions. As wear progresses, any irregular wear will result in one of the apexes being detectably sharper than the other. Testing with the sipe groups 24A as seen in FIGS. 1A and 2A, showed that with a ⅛ inch toe-in the irregular wear was detectable after only 1200 miles of tire use. In the test the sipes 34', 34", 34''' and 34'''' had lengths of 20 mm, 15 mm, 10 mm and 5 mm, respectively, and were spaced 5 mm apart axially. The sipes were approximately 5 mm deep and were hand cut having a width of less than 1 mm. The test included wearing the tire on a drum for 3600 miles. The drum had a specially designed surface to simulate a road. A lateral side force equivalent to that caused by a ⅛ inch toe-in misalignment was applied to the tire.

The following Table I summarizes 8 different wear patterns which can be detected by tactile inspection of the sipe groups described above.

TABLE 1

| Condition | Left Steer Tire | Right Steer Tire | Misalignment Condition |
|---|---|---|---|
| #1 | > | < | Toe in |
| #2 | < | > | Toe Out |
| #3 | > | > | Drive Axle Pull Left |
| #4 | < | < | Drive Axle Pull Right |
| #5 | > |   | Toe In + Drive Pull Left |
| #6 | < |   | Toe Out + Drive Pull Right |
| #7 |   | > | Toe Out + Drive Pull Left |
| #8 |   | < | Toe In + Drive Pull Right |

Thus, condition number 1 describes the situation schematically illustrated in FIG. 7. This situation may be described as having the sipes of each sipe group so arranged and constructed such that when two tires are mounted as left and right steer tires of the vehicle 50, tactilely detectable axially inward directed apexes on both tires 10L and 10R indicate excessive toe-in.

In the embodiment illustrated in FIG. 6, tactilely detectable axially outwardly directed apexes on both 10L and 10R indicate excessive toe-out, which is condition number 2 of Table 1.

In condition number 3 of Table I, and condition number 4 of Table I, tactilely detectable axially directed apexes on both tires in a common axial direction indicate drive axle misalignment pushing the vehicle opposite to the common axial direction.

As indicated in condition number 5, a tactilely detectable axially inward directed apex on the left steer tire and no tactilely detectable axial wear on the right steer tire indicates a combination of excessive toe-in and drive axle misalignment pulling to the left.

As indicated in condition number 6 of Table I, a tactilely detectable axially outward directed apex on the left steer tire and no tactilely detectable axial wear on the right steer tire indicates a combination of excessive toe-out and drive axle misalignment pulling to the right.

As indicated in condition number 7 of Table I, a tactilely detectable axially outward directed apex on the right steer tire and no tactilely detectable axial wear on the left steer tire indicates a combination of excessive toe-out and drive axle misalignment pulling to the left.

Finally, condition number 8 of Table I occurs when a tactilely detectable axially inward directed apex on the right steer tire is determined, and there is no tactilely detectable axial wear on the left steer tire, indicating a combination of excessive toe-in and drive axle misalignment pulling to the right.

Although the tires 10A and 10B in FIGS. 1A and 1B each show a plurality of sipe groups on each of the outer ribs 16 and 22, the tires may be constructed with only one plurality of sipe groups preferably located on the axially outer tread rib as the tire is mounted on the truck.

When the tire is provided with sipe groups on both axially outer tread ribs 16 and 22, the sipe groups of the second plurality of sipe groups on the tread rib 22 may be axially aligned with respective ones of the sipe groups of the plurality of sipe groups on the first axially outer tread rib 16 as seen in FIG. 1A.

Each of the sipe groups of tread rib 16 or tread rib 22 may be described as being located axially outward of a center plane 19 of the tire 10.

As seen in FIG. 1A, the sipe groups 24A on each tread rib such as tread rib 16 are circumferentially aligned with each other.

As seen in FIG. 4, each of the circumferential grooves 14 may have a groove depth 70, and each sipe such as 28B may have a sipe depth 72. Preferably the sipe depth 72 is no greater than one half the tread depth 70. The sipe depth 72 may be in a range of $4/32$ inch to $8/32$ inch.

The circumferential length 38 of each sipe group may be in a range of from 2 cm to 6 cm, and a circumferential length 39B as seen in FIG. 2B of a single sipe group portion may be in a range of from 1 cm to 3 cm.

Methods of Use

The tires 10 including the pluralities of sipe groups 24 may be utilized to provide a method of early detection of steering tire wear. The method may comprise steps of:

(a) providing left and right steering tires each having a circumferential row of sipe groups, each group including first and second sipe group portions, each sipe group portion having a shape having an axially directed crest, the crest of the first sipe group portion being directed axially inward and the crest of the second sipe group portion being directed axially outward, such that the crest of one of the sipe group portions is more tactilely detectible than the crest of the other sipe group portion as a result of axially directed wear on the sipe group; and (b) tactilely inspecting the sipe groups of both tires and detecting at least one of the wear conditions selected from the group including the following wear conditions:
left tire and right tire inwardly directed sipe group portions detectable indicating excessive toe-in; and
left tire and right tire outwardly directed sipe group portions detectable indicating excessive toe-out.

Preferably step (b) may be performed within the first $1/32$ inch of wear of the tire tread.

Thus it is seen that the apparatus and methods of the present invention readily achieve the ends and advantages mentioned as well as those inherent therein. While certain preferred embodiments of the present invention have been illustrated and described for purposes of the present disclosure, numerous changes in the arrangement and construction of parts and steps may be made by those skilled in the art, which changes are encompassed with the scope and spirit of the present invention as defined by the appended claims.

What is claimed is:

1. A method of early detection of steering tire wear, the method comprising
   (a) providing left and right steering tires each having a circumferential row of sipe groups, each group including first and second sipe group portions, each sipe group portion having a shape having an axially directed crest, the crest of the first sipe group portion being directed axially inward and the crest of the second sipe group portion being directed axially outward, such that the crest of one of the sipe group portions is more tactilely detectible than the crest of the other sipe group portion as a result of axially directed wear on the sipe group; and
   (b) tactilely inspecting the sipe groups of both tires and detecting at least one of the wear conditions selected from the group including the following wear conditions:
      left tire and right tire inwardly directed sipe group portions detectable indicating excessive toe-in; and
      left tire and right tire outwardly directed sipe group portions detectable indicating excessive toe-out.

2. The method of claim 1, wherein the group of wear conditions further includes:
   left tire and right tire rightward directed sipe group portions detectable indicating drive axle misalignment pulling to the left; and
   left and right tire leftward directed sipe group portions detectable indicating drive axle misalignment pulling to the right.

3. The method of claim 1, wherein the group of wear conditions further includes:
   left tire rightward directed sipe group portion detectable and no right tire sipe group portion detectable indicating a combination of excessive toe-in and drive axle misalignment pulling to the left;
   left tire leftward directed sipe group portion detectable and no right tire sipe group portion detectable indicating a combination of excessive toe-out and drive axle misalignment pulling to the right;
   right tire rightward directed sipe group portion detectable and no left side sipe group portion detectable indicating a combination of excessive toe-out and drive axle misalignment pulling to the left; and
   right tire leftward directed sipe group portion detectable and no left side sipe group portion detectable indicating a combination of excessive toe-in and drive axle misalignment pulling to the right.

4. The method of claim 1, wherein:
   in step (a), the row of sipe groups for each tire is located axially outward of a center plane of each respective tire.

5. The method of claim 1, wherein:
   step (b) is performed within the first $1/32$ inch of wear of the tire tread.

\* \* \* \* \*